May 7, 1957
C. A. SENDEL
2,791,702
DUPLEX WIRING SYSTEM
Filed July 8, 1953
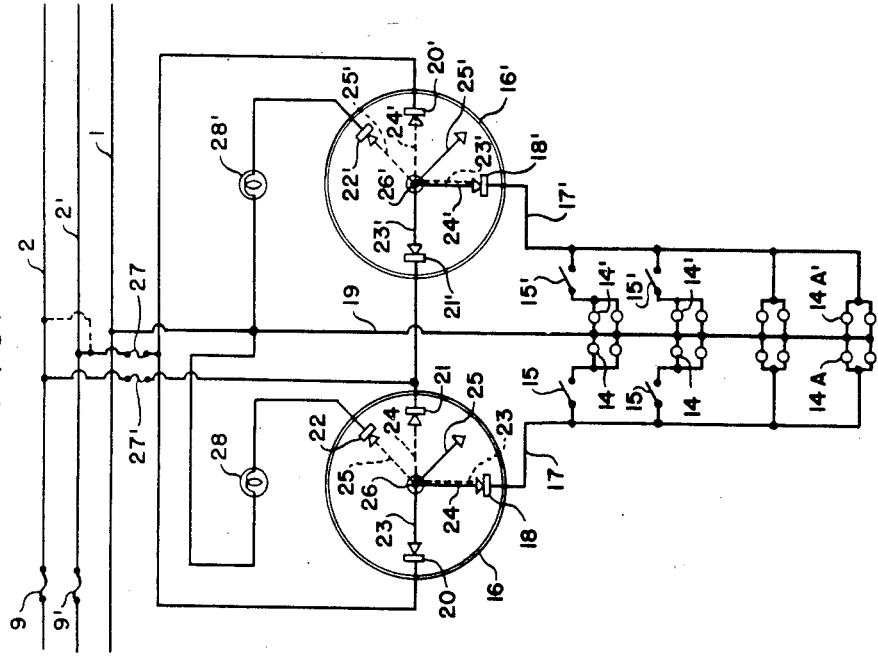
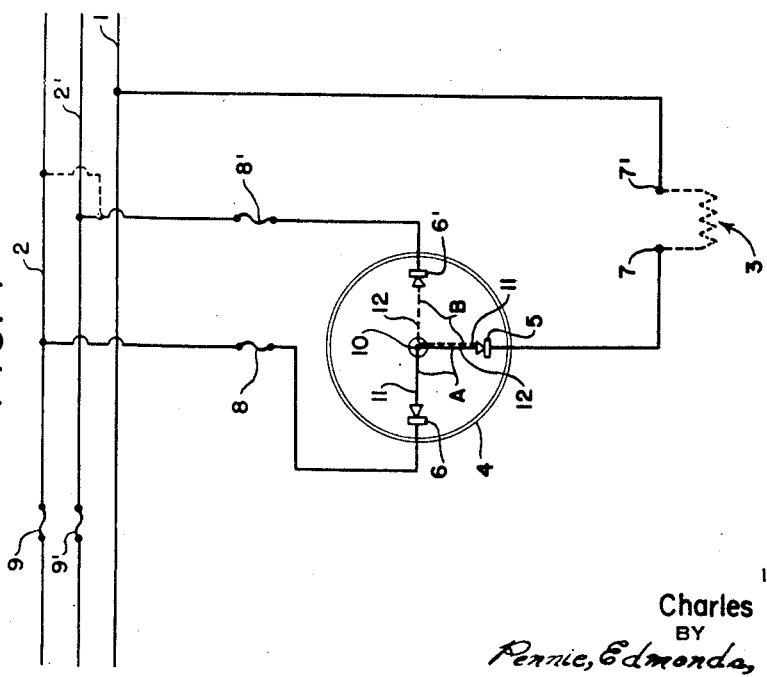
INVENTOR
Charles A. Sendel
BY
Pennie, Edmonds, Morton,
Barrows & Taylor ATTORNEYS

United States Patent Office 2,791,702
Patented May 7, 1957

2,791,702

DUPLEX WIRING SYSTEM

Charles A. Sendel, Weatherly, Pa.

Application July 8, 1953, Serial No. 375,924

5 Claims. (Cl. 307—64)

This invention relates to electric wiring systems and more particularly to a duplex wiring system which provides a regular and an emergency connection to a source of power for the same electric circuit.

Present wiring systems provided with fuses or other safety devices to protect the system against overloads are subject to the common objection that power cannot be restored to electric outlets in the circuit until the blown fuse is located and replaced. This often entails considerable time and inconvenience. In a home wiring system, a blown fuse requires the householder to interrupt his activities and gain access to the main fuse box, which, quite often, is not conveniently accessible. As often as not, in such case, a spare fuse is not available, and this also leads to further inconvenience. Or if the householder is unfamiliar with electric wiring, an electrician must be sought to perform the simple task of changing the fuse.

It is obvious that these mere inconvenience of a blown fuse may also become a matter of considerable loss where, for instance, a freezer unit containing a large amount of perishable food is without electric power for an extended period of time. A practical means for reducing to a minimum the effort and time required to restore power to a circuit after a fuse has been blown can, therefore, be of great value.

I have invented a duplex wiring system which comprises parallel normal and emergency circuits, separately fused, for supplying electric power from the usual three-wire service connection to a two-terminal outlet for the same load or loads. A single connection between the neutral wire of the service connection and one terminal of the load outlet is utilized to complete both the normal and emergency circuits of the system. I then provide a manually operated switch adapted to connect the other terminal of the load outlet alternatively to either of the high potential wires of the service connection through first and second fused connections between the switch and the high potential wires. Thus, if a short circuit develops in the load connected to the outlet, thereby blowing the fuse of the circuit normally in service, the short circuit is located and removed, and thereafter the load outlet may be switched over to the emergency circuit having a good fuse and power is immediately restored to the outlet. The blown fuse in the normal circuit may be replaced at a more convenient time without interfering with current activity. It will be readily appreciated that the wiring system of my invention permits removal of the cause of a blown fuse before the emergency circuit is invoked, thus eliminating the objection to automatic system proposed heretofore wherein the emergency circuit is immediately and automatically connected across the defective load before the cause of the fuse failure can be removed or remedied.

The switch necessary to the operation of my wiring system may be more conveniently located than the usual main fuse box and is not subject to the objection, commonly raised against fuse boxes, that it presents an unsightly appearance when located in the living quarters of a house. Furthermore, the matter of switching from the normal circuit to the emergency circuit is readily explained to persons unfamiliar with electrical wiring systems and does not involve the sometimes hit-or-miss techniques necessary to identify the blown fuse in the usual multiple-fuse assembly.

For a full explanation of the wiring system of my invention, attention is directed to the following detailed description and to the accompanying drawings in which:

Fig. 1 is a schematic diagram of a duplex wiring system of my invention;

Fig. 2 is a modification of the duplex wiring system of Fig. 1.

Referring now to Fig. 1, the service connection comprises a conventional three-wire line which includes a neutral wire 1 and a pair of high potential wires 2 and 2' at substantially the same voltage with respect to the neutral. According to my invention, I provide a two-terminal load outlet 3 with normal and emergency fused circuits for alternatively supplying the outlet with power from the service connection as follows.

A two-position master switch 4 having contacts 5, 6 and 6' is connected at contact 5 to one terminal 7 of the load outlet 3. Terminals 6 and 6' of the switch 4 are then connected to high potential wires 2 and 2' through fuses 8 and 8', respectively. These fused connections may be alternatively selected for connection to the terminal 7 of load outlet 3 by manual control of armature 10 in master switch 4, which armature has electrically connected contact arms 11 and 12. When the armature 10 is in position A shown in solid lines in Fig. 1, the contact arms 11 and 12 engage contacts 6 and 5, respectively, and connect the load outlet to the high potential wire 2 through the fuse 8, the resulting complete circuit being referred to hereinafter as the "normal" circuit. Similarly, when the armature 10 is in position B shown in broken line, the contact arms 11 and 12 engage contacts 5 and 6', respectively, thus connecting the load outlet to the high potential wire 2' through the fuse 8', and the resulting complete circuit will be referred to hereinafter as the "emergency" circuit. Both the normal and emergency circuits are served by a single return wire 13 connected between the other outlet terminal 7' and the neutral wire 1 of the service connection.

In some circumstances it is the practice to protect the service connection with master fuses 9 and 9'. Since it is possible that a master fuse 9 may be blown at the same time that a circuit fuse 8 is blown the fuse-to-service connection, illustrated in solid line in Fig. 1, provides the utmost assurance that at least one circuit will always be provided with power. However, where the paramount consideration is maintenance of the connections to the switch contacts 6 and 6' at the same potential, both of the fuses 8 and 8' may be connected to the same high potential wire 2 or 2' as indicated in broken line.

The operation of my novel duplex wiring system is as follows. In the event that an overload or a short circuit occurs at the load outlet 3 while the master switch is in its normal position A, the fuse 8 of the normal circuit will be blown and power to the outlet will be interrupted. Upon this occurrence, the source of the short circuit or overload will usually be apparent. After the cause of the overload has been removed from the outlet or has been otherwise remedied, the armature 10 of master switch 4 is manually changed to its emergency position B so as to connect the emergency circuit, and its fuse 8', to the load outlet 3. At some convenient later time the blown fuse at 8 may be located and replaced, at which time the master switch 4 is manually returned to its normal position A to re-establish the normal circuit supplying the load outlet.

In Fig. 2 I have shown a modification of the duplex wiring system of my invention adapted to be used in a house having several rooms, each room having several outlets. It will be understood that these outlets may be located in the ceiling for light fixtures 14 and 14' or may be wall receptacles 14A and 14A', or a combination of both. The wiring of these outlets is that of conventional three-wire practice, and the outlets in each room may, if desired, be provided with a switch as at 15 and 15'.

One terminal of each of these outlets is connected by a single wire 19 to the neutral wire 1 of the service connection. In this modification of the wiring system embodying my invention I provide two master switches 16 and 16', each of which is similar to the master switch 4 of Fig. 1. The connections 17 and 17' from the switches 15 and 15', respectively, which control the outlets, are connected to contacts 18 and 18', respectively, of the master switches 16 and 16'. The contacts 20 and 20' of the master switches are connected to high potential wire 2 of the service connection through a fuse 27, and contacts 21 and 21' are similarly connected to the other high potential wire 2' of the service connection through a fuse 27'. As in the case of switch 4 of Fig. 1, each of the switches 16 and 16' have armatures 26 and 26' with contact arms 23 and 24 and contact arms 23' and 24', respectively. As additional desirable elements, I provide for these switches contacts 22 and 22' and contact arms 25 and 25' electrically connected to the other contact arms of their respective switches. In Fig. 2 the armatures 26 and 26' are shown in their normal positions A and A', similar to position A of Fig. 1, in which the contact arms 25 and 25' do not engage any contacts. However, when the armatures are in emergency positions B and B', respectively, as shown in broken line, the arms 25 and 25' engage contacts 22 and 22', respectively. Connected in series between these contacts and wire 19 are conspicuously located signal lights 28 and 28'.

Operation of the embodiment of Fig. 2 is essentially similar to that of Fig. 1. If an overload or a short circuit occurs at one of the outlets, for example at outlet 14A', the fuse 27' will be blown and all the outlets 14' supplied through the master switch 16' when in normal position A' will then be without power; however, the rooms will remain lit at half-brilliance since fixtures 14 are still supplied with power. Upon location of the short circuit or overload, it can be remedied or switched out of the circuit by its associated switch 15', and then the switch 16' is turned to its emergency position B'. This will immediately restore the rooms to full brilliance excepting, of course, a room where a fixture has been switched off at its associated switch 15'. In position B', the contact arms 23' and 24' of switch 16 establish an emergency circuit through fuse 27 for those outlets affected by the blown fuse 27'. Moreover, the contact arm 25' will engage the contact 22' to turn on the signal light 28'. This light will serve as a constant reminder that the circuit requires attention to return it to normal.

As with the system of Fig. 1, the defective fuse 27' may be replaced at any convenient time and thereafter the switch 16' is returned to its normal position A' to reestablish the normal circuit to outlets 14'. It will be readily apparent that, if a short circuit occurs at one of the outlets 14 regularly supplied with power through fuse 27, an emergency circuit may be similarly established through fuse 27' for these outlets simply by remedying the trouble at the outlet or switching the outlet out of the circuit by its associated switch 15, and then turning the master switch 16 from its normal position A to its emergency position B, at which time signal light 28 will be turned on.

It will be apparent to one skilled in the art that any suitable protective devices such as automatic circuit breakers may be used in place of the fuses previously described. Furthermore, while I have described my system as connected to a three-wire service connection, it is equally adaptable to a two-wire service connection, in which case one wire serves as the neutral and both fuses are connected to the second wire. It will also be apparent that the embodiments of Figs. 1 and 2 are adaptable to any service voltage and, furthermore, that either of these embodiments may be adapted to use direct current by the substitution of grounded negative in place of the neutral 1.

I am aware that it is old in the art to provide an automatic switching means for alternative sources of power supplying the same load so that, upon failure of one source of power, the other source is automatically and instantaneously connected to the load. Such an arrangement is, however, entirely inapplicable to the problem solved by my invention for the obvious reason that an automatic switch offers no opportunity to remove the short circuit or overload which causes the fuse normally protecting the circuit to fail. Instead, an automatic switch immediately connects the outlet at which the short circuit occurs to the emergency circuit and thus blows the fuse in the emergency circuit as well.

I claim:

1. In an electric wiring system for connecting a load to a source of electric power the improvement which comprises a normal circuit and an emergency circuit, said circuits having in common a connection between one terminal of the source and one terminal of the load, and each circuit comprising, in serial connection between another terminal of the source and another terminal of the load, safety means operable upon overload to interrupt that circuit and manually controlled means for interrupting that circuit.

2. An electric wiring system for connecting a three-wire power source having a neutral wire and two high potential wires to a load, which system comprises a terminal for each of the three power source wires, a two-terminal load outlet, the neutral wire terminal being connected to one terminal of the load outlet, a switch adapted to be manually controlled to connect the other terminal of the load outlet alternatively to either of the two high potential wire terminals, and fuses connected between the switch and each of the high potential wire terminals.

3. An electric wiring system for connecting a three-wire power source having a neutral wire and two high potential wires to a load, which system comprises a terminal for each of the three power source wires, a two-terminal load outlet, the neutral wire terminal being connected through a first load wire to one terminal of the load outlet, a switch, a second load wire connecting the switch to the other terminal of the load outlet, first and second fused connections between the switch and the two high potential power wires, respectively, and a manually operated element in the switch adapted to connect said second load wire alternatively to either of said fused connections.

4. A wiring system for supplying electric power from a source thereof to a plurality of loads which system comprises a plurality of pairs of terminals for connecting said loads to the system, first and second fuses connected to one terminal of said source, a neutral connecting one terminal of each of all pairs of terminals to the other terminal of said source, a first connection common to the other terminals of less than all of said pairs of terminals normally connected to the source through said first fuse, a second connection common to the other terminals of the remainder of said pairs of terminals normally connected to the source through said second fuse, and first and second master switches adapted to selectively connect said first and second common connections respectively to the source through either said first or said second fuses, whereby upon failure of one of said fuses the common connection normally connected thereto may be switched over to the other of said fused connections and power may be supplied therethrough.

5. A wiring system for connecting a plurality of loads to a three-wire source of electric power which system comprises at least two groups of a plurality of pairs of terminals for connecting loads to the system, a fuse connected to each of the high potential wires of the source, a neutral connection for one terminal of each of all pairs of terminals to the neutral wire of the source, a first connection connecting the other terminal of each of said pairs of terminals of less than all of said groups and normally connected to the source through said first fuse, a second connection connecting the other terminal of each of said pairs of terminals of the remainder of said groups and normally connected to the source through said second fuse, first and second master switches adapted selectively to connect said first and second connections respectively to the source through either said first or second fuses, and signal means adapted to indicate that either of said connections is connected to the high potential wire of the source to which it is not normally connected, whereby, upon failure of one of the fuses due to an overload at a pair of terminals in one group, that group may be disconnected and the remainder of the groups normally connected to the source through that fuse may be connected to the source through the other fuse and be supplied with power therethrough.

References Cited in the file of this patent

UNITED STATES PATENTS

| | | |
|---|---|---|
| 552,496 | Mayrhofer | Dec. 31, 1895 |
| 776,998 | Cameron | Dec. 6, 1904 |
| 840,216 | Hundhausen | Jan. 1, 1907 |